US012081108B2

(12) United States Patent
Amende et al.

(10) Patent No.: US 12,081,108 B2
(45) Date of Patent: Sep. 3, 2024

(54) SEALING SLEEVE FOR A STATOR OF AN ELECTRICAL MACHINE

(71) Applicant: Rolls-Royce Deutschland Ltd & Co KG, Blankenfelde-Mahlow (DE)

(72) Inventors: Tony Amende, Möhrendorf (DE); Thomas Kuebel, Erlangen (DE); Thomas Rettig, Möhrendorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 355 days.

(21) Appl. No.: 17/434,090

(22) PCT Filed: Feb. 26, 2020

(86) PCT No.: PCT/EP2020/055067
§ 371 (c)(1),
(2) Date: Aug. 26, 2021

(87) PCT Pub. No.: WO2020/174021
PCT Pub. Date: Sep. 3, 2020

(65) Prior Publication Data
US 2022/0140699 A1    May 5, 2022

(30) Foreign Application Priority Data
Feb. 28, 2019    (DE) ..................... 10 2019 202 760.1

(51) Int. Cl.
*H02K 9/19*    (2006.01)
*H02K 1/20*    (2006.01)
(Continued)

(52) U.S. Cl.
CPC .............. *H02K 9/197* (2013.01); *H02K 1/20* (2013.01); *H02K 3/24* (2013.01); *H02K 5/203* (2021.01)

(58) Field of Classification Search
CPC ............ H02K 1/20; H02K 3/24; H02K 5/203; H02K 9/197; G01S 17/06; G01S 17/74;
(Continued)

(56) References Cited

U.S. PATENT DOCUMENTS

| 7,378,768 B2 * | 5/2008 | Ohkawa | ................. | H02K 5/225 |
| | | | | 310/49.18 |
| 2003/0160532 A1* | 8/2003 | Suzuki | ..................... | H02K 5/08 |
| | | | | 310/194 |
| 2007/0262664 A1* | 11/2007 | Niehaus | ................. | H02K 3/522 |
| | | | | 310/194 |

FOREIGN PATENT DOCUMENTS

| DE | 4229395 A1 | 3/1994 |
| DE | 10305174 A1 | 9/2004 |
(Continued)

OTHER PUBLICATIONS

International Search Report and the Written Opinion for International Patent Application PCT/EP2020/055067 mailed Jun. 3, 2020.
(Continued)

*Primary Examiner* — Naishadh N Desai
(74) *Attorney, Agent, or Firm* — Lempia Summerfield Katz LLC (57) ABSTRACT

A sealing sleeve for a stator of an electrical machine is disclosed. The sealing sleeve is configured to provide that a coolant flowing around the stator coils follows a predefined, serpentine coolant path. The sleeve has two sealing rings arranged on the stator with the coils of the stator lying between them. Each sealing ring includes a hard component and a soft component. The sleeve is arranged on the stator such that sealing sections of the soft component bear against the surfaces of the stator coils and adapt to the coil surfaces. As such, no coolant may pass between the coils and the sealing rings at these sealing locations thus formed, and therefore the desired coolant flow is guaranteed. Further-
(Continued)

more, the sealing rings are configured such that alternately for each coil only one of the sealing rings has a sealing section so that ultimately the serpentine coolant flow is achieved.

16 Claims, 8 Drawing Sheets

(51) Int. Cl.
*H02K 3/24* (2006.01)
*H02K 5/20* (2006.01)
*H02K 9/197* (2006.01)

(58) Field of Classification Search
CPC ................ G01S 17/931; G05D 1/0236; G05D 1/0244
See application file for complete search history.

(56) References Cited

FOREIGN PATENT DOCUMENTS

DE  102015220509 A1  4/2016
EP      1102383 A2  5/2001

OTHER PUBLICATIONS

German Office Action for German Patent Application No. 10 2019 202 760.1 mailed May 2, 2024, pp. 1-10.

\* cited by examiner

SEALING SLEEVE FOR A STATOR OF AN ELECTRICAL MACHINE

The present patent document is a § 371 nationalization of PCT Application Serial No. PCT/EP2020/055067, filed Feb. 26, 2020, designating the United States, which is hereby incorporated by reference, and this patent document also claims the benefit of German Patent Application No. 10 2019 202 760.1, filed Feb. 28, 2019, which is also hereby incorporated by reference.

TECHNICAL FIELD

The disclosure relates to a stator for an electrical machine and, in particular, to a sealing sleeve for sealing the stator for this purpose.

BACKGROUND

As an alternative to conventional internal combustion engines, concepts based on electric drive systems are being tested and used for propelling aircraft, (e.g., airplanes or helicopters), or also for electrically powered watercraft, etc. An electric or hybrid-electric drive system of this type may have one or a plurality of electrical machines which, depending on the specific application in the drive system, may be configured as generators and/or as electric motors.

The electric drives and the corresponding machines to be used for such mobile applications are distinguished by an extremely high power density in order to be able to generate the required power levels. While power densities of the order of up to 2 kW/kg are sufficient for many technical applications, electrical machines having power densities which may be of the order of, e.g., 20 kW/kg are being pursued for the electrification of aviation, (that is to say, for electrically or hybrid-electrically driven aircraft), and also for other applications, (e.g., mobile applications).

Because there also is increased heat generation in the active parts of the machine with increasing power density during the operation of the machine, increased demands are likewise placed on the associated cooling system. Particularly, in the case of electric drive systems for aviation, use is made inter alia of liquid-cooled motors, in which, to cool the stator for example, a cooling fluid is passed along a meandering path around the coils of the stator. In order, on the one hand, to provide the desired course of the cooling fluid and, on the other hand, to prevent leakage of the cooling fluid, (e.g., unintentional escape of the cooling fluid from the region in which the stator coils to be cooled are located), a sealing sleeve is applied to the stator. The sealing sleeve includes two rings composed of plastic, for example, each of which is positioned on a respective end of the stator in such a way that the two desired effects are achieved. In particular, a respective sealing ring rests against the coils at specific sealing locations.

By virtue of the design configuration of the sleeve to bring about the meandering alternate flow routing, however, leaks occur at the respective sealing locations with respect to the coils, leading to a fluid-dynamic bypasses and thus to losses in the optimum cooling characteristic. As a result, the cooling performance is restricted.

SUMMARY AND DESCRIPTION

It is therefore an object of the present disclosure to indicate an approach to improved coolant flow in the stator. This object is achieved by the sealing ring of a sealing sleeve for a stator of an electrical machine. Further solutions are offered by the sealing sleeve and by the stator itself. The scope of the present disclosure is defined solely by the appended claims and is not affected to any degree by the statements within this summary. The present embodiments may obviate one or more of the drawbacks or limitations in the related art.

One reason for the problems described, which is reflected in a reduced cooling performance, is that the shape or surfaces of the sealing rings of the sealing sleeve are not matched exactly to the corresponding surfaces of the coils at those locations at which they rest against the coils or against the wires forming the respective coil, e.g., at the sealing locations, owing to manufacturing tolerances of the winding process of the coils, and therefore corresponding unsealed gaps have to be accepted at those locations. This leads to the leaks mentioned.

For the sake of completeness and clarity, it may be mentioned that the term "leak" in the context addressed here refers not so much to escape from the stator system and thus to a loss of cooling fluid but more to passage of the coolant through the unsealed gaps at the "sealing locations" between the coils and the sealing rings of the sealing sleeve. Although the cooling fluid remains in the stator system when the cooling fluid passes through the unsealed gaps in this way, some of it takes a path which differs from the envisaged or meandering path, and this has a negative effect on cooling performance.

The concept underlying the disclosure is that the sealing rings forming the sealing sleeve are each composed of at least two components. The first component of the sealing ring provides the mechanical retention of the complete sealing sleeve in the motor. For this purpose, the first component is hard and has little capacity for mechanical deformation. The second component of the sealing ring, which is softer and elastically deformable, produces the sealing against coolant leakage in relation to the respective coil, in particular at the sealing locations.

Thus, a respective sealing ring of a sealing sleeve which has two such sealing rings and is intended for an electrical machine stator having a multiplicity of coils and stator teeth has a first, substantially hard component and a second, deformable or elastic component applied to a first axial surface of the first component. Thus, the sealing ring may be composed of a partially hard and a partially soft elastomer, for example. The soft plastic or the like is intended to provide exact sealing of contact points with the coils through appropriate deformability of the sealing sleeve or of the second component.

The second component includes first seal sections arranged on the first axial surface in a manner distributed along a tangential direction and with specific angular spacings relative to one another.

Because the seal sections are arranged along the tangential direction or along the circumferential direction, it seems appropriate not to use Cartesian coordinates to describe their positions but to make use of angles, wherein the axis of symmetry of the stator is assumed as a reference or reference axis.

When viewed in the tangential direction, the angular spacings between the centers of two adjacent first seal sections are $360°/n212'$, where $n212'$ indicates the number of first seal sections. Here, $n212'=n121/N$, where $n121$ indicates the number of coils of the stator and $N \geq 2$, (e.g., $N=2$). As such, $n121$ and $N$ may be chosen in such a way that $n121/N$ is an integer. The numbers and positions of the seal sections are thus correlated directly with the number of coils, and therefore the sealing rings of the sealing sleeve may be configured in an optimum manner to the stator.

The sealing ring has a radially outer region and a radially inner region, wherein the first seal sections extend in the radial direction between the two regions, e.g., without projecting into these regions. This refers to the situation where the inner and outer regions do in fact extend over a certain distance in the radial direction and are not virtually linear. The regions are coaxial with one another, and the inside diameter of the radially outer region is greater than the outside diameter of the radially inner region. Consistent with this, the first seal sections have an extent in the radial direction which is correspondingly less than the difference between the diameters of the regions of the sealing ring.

As a result, the radial extent of one of the two radial regions of the sealing ring corresponds to a radial thickness of a respective tooth root of the stator teeth. Likewise, the radial extent of the other of the two radial regions of the sealing ring corresponds to a radial thickness of a respective tooth head of the stator teeth. Moreover, a radial spacing between the two regions, over which the first seal sections also extend, corresponds to a radial extent of a respective tooth neck of the stator teeth.

This design makes it possible to arrange the sealing rings on the stator in such a way that, on the one hand, the first, hard component rests against the tooth roots or heads of the stator teeth of the stator, for example, and, on the other hand, the first seal sections simultaneously rest against specific coils, for example.

In a further embodiment, the soft, second component includes further seal sections, wherein at least one first of the further seal sections is applied in the radially outer region of the first axial surface of the first component, and a second of the further seal sections is applied in the radially inner region of the first axial surface of the first component. Both of the further seal sections are circular-ring-shaped and, like the radial regions of the respective ring, are coaxial with one another. The first seal sections extend in the radial direction between the first and the second further seal sections, and therefore these are ultimately connected to one another or merge into one another. The inside diameter of the radially outer, first further seal section is greater than the outside diameter of the radially inner, second further seal section.

In respect of the extent of the first seal sections in the tangential direction, it is advantageous if this extent corresponds to a tangential extent of a respective stator tooth against which the respective seal section is supposed to rest. This provides that there are no regions in which cooling fluid may build up.

A corresponding sealing sleeve for an electrical machine stator having a multiplicity n121 of coils and stator teeth has a first sealing ring of this kind and a second sealing ring of this kind. The sealing rings are arranged coaxially with one another in such a way that the first axial surfaces of the two sealing rings and, with them, the second components of the two sealing rings face one another. Further, the first sealing ring is rotated by an angle $\beta=360°/n121$ relative to the second sealing ring.

The second component of each sealing ring includes a multiplicity of first seal sections arranged on the first axial surface of a respective sealing ring in a manner distributed along a tangential direction and with specific angular spacings relative to one another. The first seal sections of the second component of the first sealing ring are arranged at angles of $\alpha 212'(l)=l*360°/n212'$, where $l=1, \ldots, n212'$, wherein n212' indicates the number of first seal sections of the first sealing ring. The first seal sections of the second component of the second sealing ring are arranged at angles of $\alpha 222'(l)=\beta+l*360°/n222'$, where $l=1, \ldots, n222'$, wherein n222' indicates the number of first seal sections of the second sealing ring.

A stator according to the disclosure for an electrical machine has a multiplicity n121 of coils, which are arranged one behind the other when viewed in the tangential direction, as well as a sealing sleeve which performs the functions mentioned at the outset. For this purpose, the sealing sleeve is arranged on the stator in such a way that the coils are situated in the axial direction between the first sealing ring and the second sealing ring.

At specific sealing locations, at least first seal sections of the second components of the two sealing rings of the sealing sleeve each rest against specific coils of the multiplicity of coils at the two ends of the stator. When the coils and second components are resting against one another, (e.g., at the sealing locations), that surface of the first seal section of the second component which faces the coil in each case adapts to that surface of the coil which faces this first seal section of the second component by virtue of the deformability of the second component. The result is that the respective sealing location obtained in this case is very largely fluid tight, in particular with respect to a coolant flowing around the stator coils.

The sealing sleeve is arranged in such a way relative to the stator coils that first seal sections of the second component of the first sealing ring, but not first seal sections of the second component of the second ring, rest against each $N^{th}$ coil of the stator, where $N \geq 2$, in particular $N=2$. Additionally, first seal sections of the second component of the second sealing ring, but not first seal sections of the second component of the first ring, rest against the remaining coils of the stator.

In the case of a coil against which one of the first seal sections of one of the two sealing rings rests, there is an intermediate space between this coil and the first component of the other sealing ring, in particular an intermediate space through which a cooling fluid for cooling the stator may pass. As such, the cooling fluid may flow in the tangential direction through the respective intermediate space, past the respective coil, to the next coil adjacent to the respective coil.

By the described arrangement of the sealing sleeve with sealing rings rotated relative to one another with respect to the coils, the meandering coolant path is ultimately produced.

In one specific embodiment, the coils are arranged at angles of $\alpha 121(k)=k*360°/n121$, where $k=1, \ldots, n121$. The first seal sections of the second component of the first sealing ring are arranged at angles of $\alpha 212'(l)=l*360°/n212'$ where $l=1, \ldots, n212'$, wherein n212' indicates the number of first seal sections of the first sealing ring. At the same time, the first seal sections of the second sealing ring are arranged at angles of $\alpha 222'(l)=\beta+l*360°/n222'$, where $l=1, \ldots, n222'$, wherein n222' indicates the number of first seal sections of the second sealing ring, and wherein $\beta=360°/n121$ describes the rotation of the second sealing ring relative to the first sealing ring. In particular, the following applies here: $n212'=n222'=n121/2$.

The above information and that which follows relating to the positions and angles of coils, seal sections, etc., in each case relates to the center thereof.

A sealing ring of this kind may be composed of a partially hard and a partially soft elastomer, for example. To produce a sealing ring of this kind, the second, deformable or elastic component, for example, may be applied to the hard component in a single operation. An injection molding process may be suitable for the production of a sealing ring of this kind. It would also be conceivable to employ an additive manufacturing method to produce the two-component sealing ring. During the assembly of sealing sleeves having two identical sealing rings of this kind and a stator, care should then be taken to secure the sealing rings on the stator in a manner rotated relative to one another by a specific angle, giving the above-designated angular positions α121(k), α212'(l), α222'(l) of the coils and first seal sections and thus ultimately of the meandering coolant path.

Further advantages and embodiments may be found in the drawings and the corresponding description.

BRIEF DESCRIPTION OF THE DRAWINGS

The disclosure and exemplary embodiments are explained in more detail below with reference to drawings. There, the same components are identified by the same reference signs in various figures. It is therefore possible that, when a second figure is being described, no detailed explanation is given of a specific reference sign that has already been explained in relation to another, first figure. In such a case, it may be assumed for the embodiment of the second figure that, even without detailed explanation in relation to the second figure, the component identified there by this reference sign has the same properties and functionalities as explained in relation to the first figure. Furthermore, for the sake of clarity, in some cases not all the reference signs are illustrated in all of the figures, but only those to which reference is made in the description of the respective figure.

In the drawings.

DETAILED DESCRIPTION

As disclosed herein, terms such as "axial", "radial", "tangential", etc. relate to the axis used in the respective figure or in the example described in each case. In other words, the directions axially, radially, and tangentially relate to an axis of rotation of the rotor and hence to the corresponding axis of symmetry of the stator. "Axial" herein describes a direction parallel to the axis, "radial" describes a direction orthogonal to the axis, toward or away from the latter, and "tangential" is a direction which is directed in a circle around the axis at a constant radial spacing from the axis and with a constant axial position.

Furthermore, the terms "axial", "radial", or "tangential", respectively, in the context of an area, (e.g., a surface), mean that the normal vector of the respective axial, radial, or tangential surface is oriented in the axial, radial, or tangential direction, whereby the orientation of the respective area in space is unequivocally described.

In connection with component parts, (e.g., coils or stator teeth), the term "adjacent" is intended to express the fact that, in the case of "adjacent component parts" there is, in particular, no further such component part between these two component parts but at most an empty intermediate space.

Here, the expression "coaxial component parts", (e.g., coaxial rings), is taken to mean component parts which have identical normal vectors, for which, therefore, the planes defined by the coaxial component parts are parallel to one another. Furthermore, the expression is intended to entail that, although the central points of coaxial component parts lie on the same axis of rotation or symmetry, they may lie on this axis at different axial positions, and the planes are thus at a distance >0 from one another. The expression does not necessarily require that coaxial components have the same radius.

Figure 1:
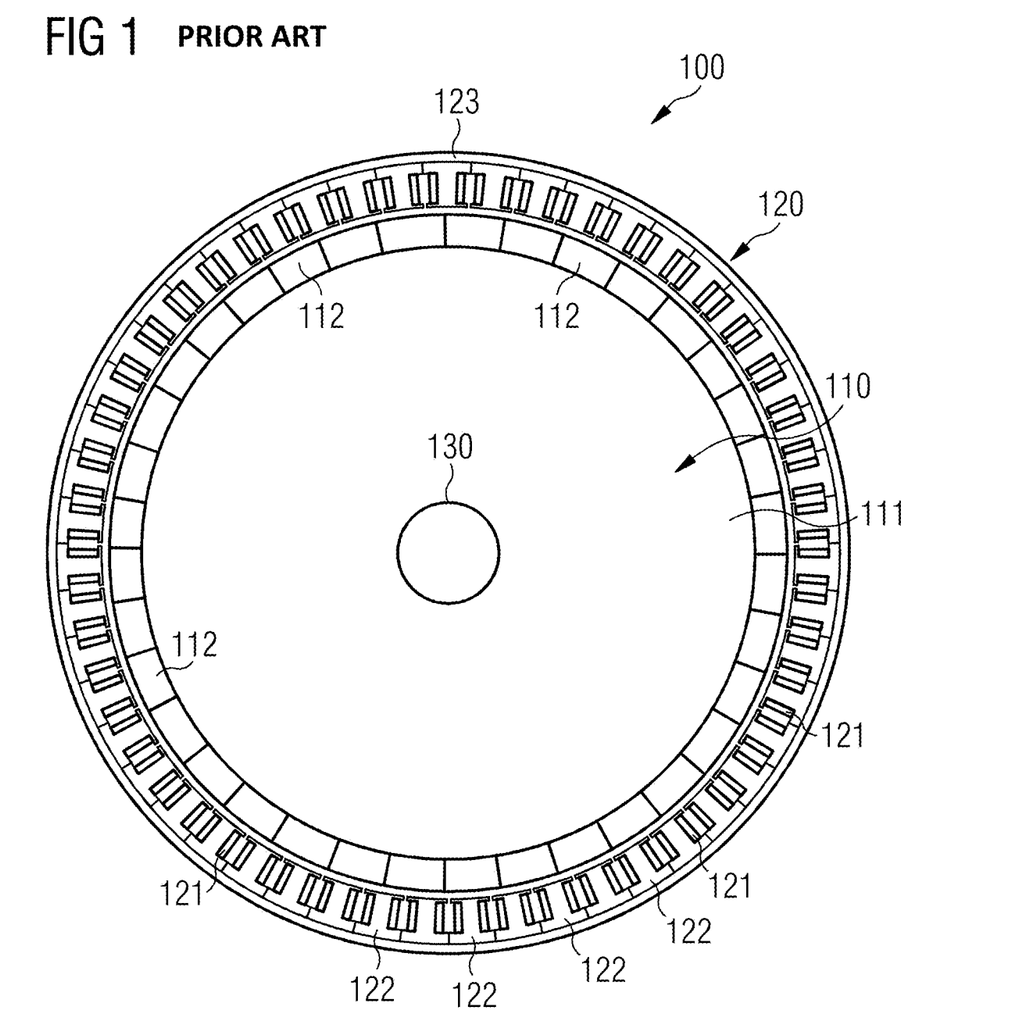
FIG. 1 shows an example of a known electrical machine.

FIG. 1 shows by way of example an electrical machine 100 formed as an electric motor, as is known in the prior art. The electrical machine 100, in a similar structure, may also be operated as a generator in principle. Furthermore, the construction of the machine 100 described in the text which follows is greatly simplified and furthermore does not show some of the details explained in connection with the other figures, but rather serves only to illustrate the fundamental functional mode of the electric motor 100. The various component parts of the machine 100 may be arranged differently, depending on whether the electrical machine 100 is configured as a generator, an electric motor, and/or a radial-flow or axial-flow machine with a rotor designed as an internal or external rotor, etc.

The electric motor 100 has a substantially annular stator 120 and a substantially cylindrical rotor 110, formed here as an internal rotor, the rotor 110 being arranged within the stator 120 and, in the operating state of the electric motor 100, rotating about an axis of rotation. The rotor 110, or its substantially cylindrical rotor main body 111, is connected to a shaft 130 for conjoint rotation, so that a rotation of the rotor 110 may be transmitted via the shaft 130 to a component part to be driven (not shown), for example to a propeller of an aircraft.

The stator 120 has first magnetic components 121, which may be implemented as stator windings 121 or coils 121, for example. Each of the coils 121 is formed by an electrical conductor. The conductors 121 have in each case been wound onto a stator tooth 122 of the stator 120 and, in the operating state of the electric motor 100, an electric current flows through the conductors so that magnetic fields are generated. The stator teeth 122 are fastened on a stator ring 123. The rotor 110 has second magnetic components 112, which may be formed as permanent magnets 111 or as excited or excitable windings. It is assumed in the text which follows that they are permanent magnets 112.

For the sake of clarity, only a small number of first and second magnetic means 121, 112 and stator teeth 122 are provided with designations.

The first and second magnetic components 121, 112 are formed and spaced apart from one another by an air gap in such a manner that, in the operating state of the electric motor 100, they interact electromagnetically with one another. This concept, including the conditions for the design and precise arrangement of the magnetic means 112, 121 or of the rotor 110 and stator 120, are known per se and therefore is not explained in more detail below. To operate the electrical machine 100 as an electric motor, by using a current source that is not shown, an electric current is applied to the coils 121 and has the effect that the coils 121 generate corresponding magnetic fields, which come to interact electromagnetically with the magnetic fields of the permanent magnets 112 of the rotor 110. This results in a torque acting on the permanent magnets 112, which, provided that the permanent magnets 112 are connected sufficiently firmly to the rotor main body 111, has the effect that the rotor 110 and conjointly therewith the shaft 130 are set in rotation when the component parts are suitably configured and disposed in relation to one another.

This concept of designing the electrical machine 100 as an electric motor may be assumed to be known. The corresponding configuration and use of the electrical machine 100 as a generator may also be assumed to be known. In this configuration, the shaft 130, and with it the rotor 110, are driven by a motor or the like, so that electric currents are induced in the coils 121. These may be picked off at corresponding electrical contacts of the electrical machine 100 that are not shown. On account of the familiarity of the concepts, the two designs of the electrical machine 100 are not detailed any further below.

Figure 2:
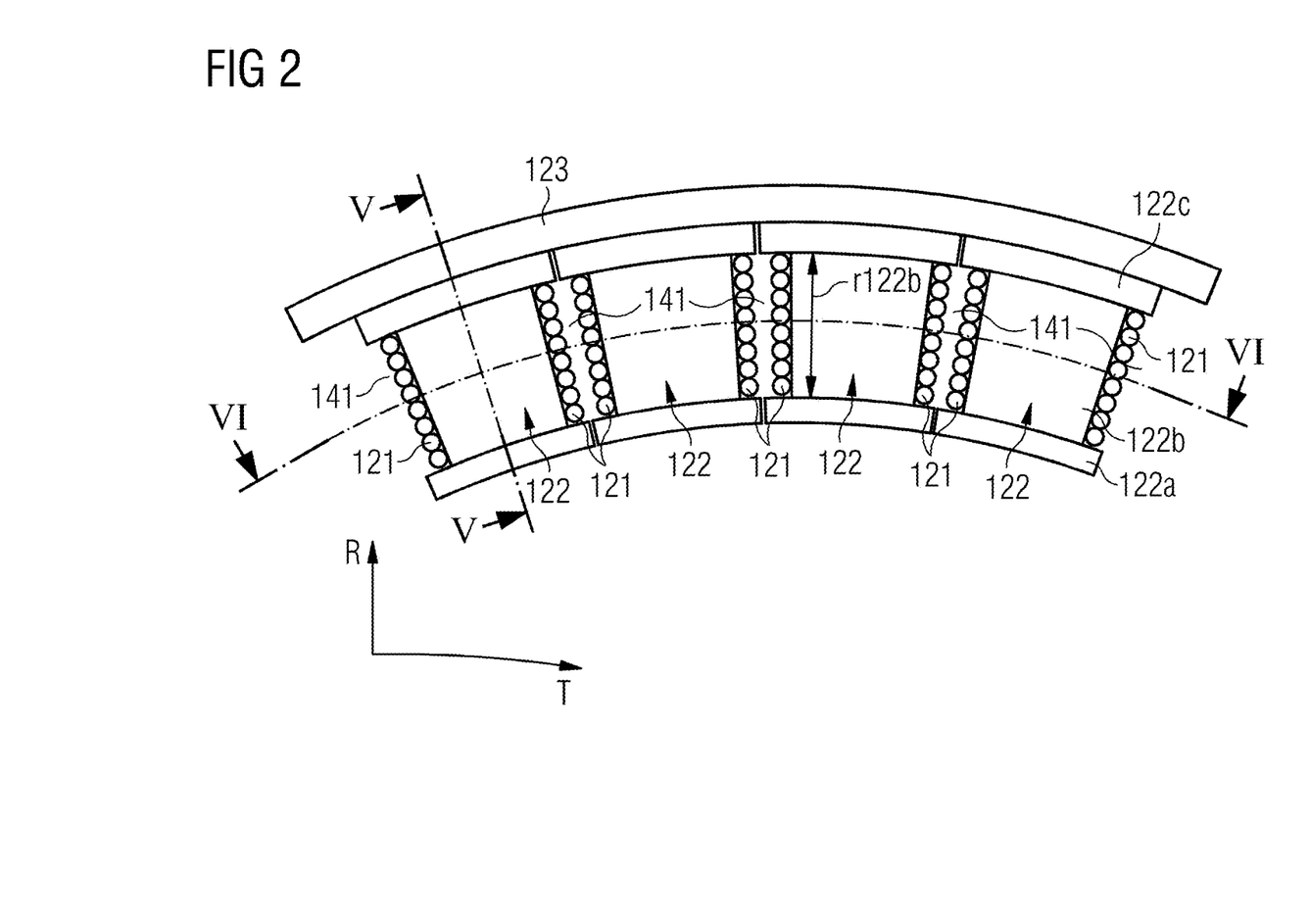
FIG. 2 shows an example of an axial view of a section through a number of stator teeth of a stator of the electrical machine.

FIG. 2 shows a view, oriented in axial direction A, of a section through a number of the stator teeth 122. This view is denoted by "II" in FIG. 4. The teeth 122 are arranged one behind the other on the stator ring 123 when viewed in the tangential direction T. Each stator tooth 122 has a tooth head 122a, a tooth root 122c, and a tooth neck 122b extending in the radial direction R between the tooth head 122a and the tooth root 122c over a distance r122b (the reference signs mentioned are indicated for only one of the illustrated teeth 122 in FIG. 2 for the sake of clarity). In the state of installation in the machine 100, the respective tooth head 122a faces the rotor 110, while the respective tooth 122 is secured by the respective tooth root 122c on the stator ring 123.

When viewed in the positive and the negative tangential direction T as well as in the axial direction A, the tooth head 122a and the tooth root 122c may each project beyond the tooth neck 122b. The tooth neck 122b is used to position the respective coil 121 there.

As may be seen in FIG. 2, the stator teeth 122 with the coils 121 are dimensioned in such a way that intermediate spaces 141 are formed between two adjacent stator teeth 122 and between the coils 121 positioned on these teeth 122. As explained below, these intermediate spaces 141 in particular, together with the intermediate spaces 142 yet to be described, form a coolant path 140, which may lead in a meandering form around the stator teeth 122 and through which there flows a coolant in order to cool the coils 121, in particular. For the sake of clarity, the coolant is not provided with reference signs in the figures. However, it may be assumed that the coolant flows along the meandering coolant path 140 and in the process dissipates heat from the coils 121.

Figure 3:
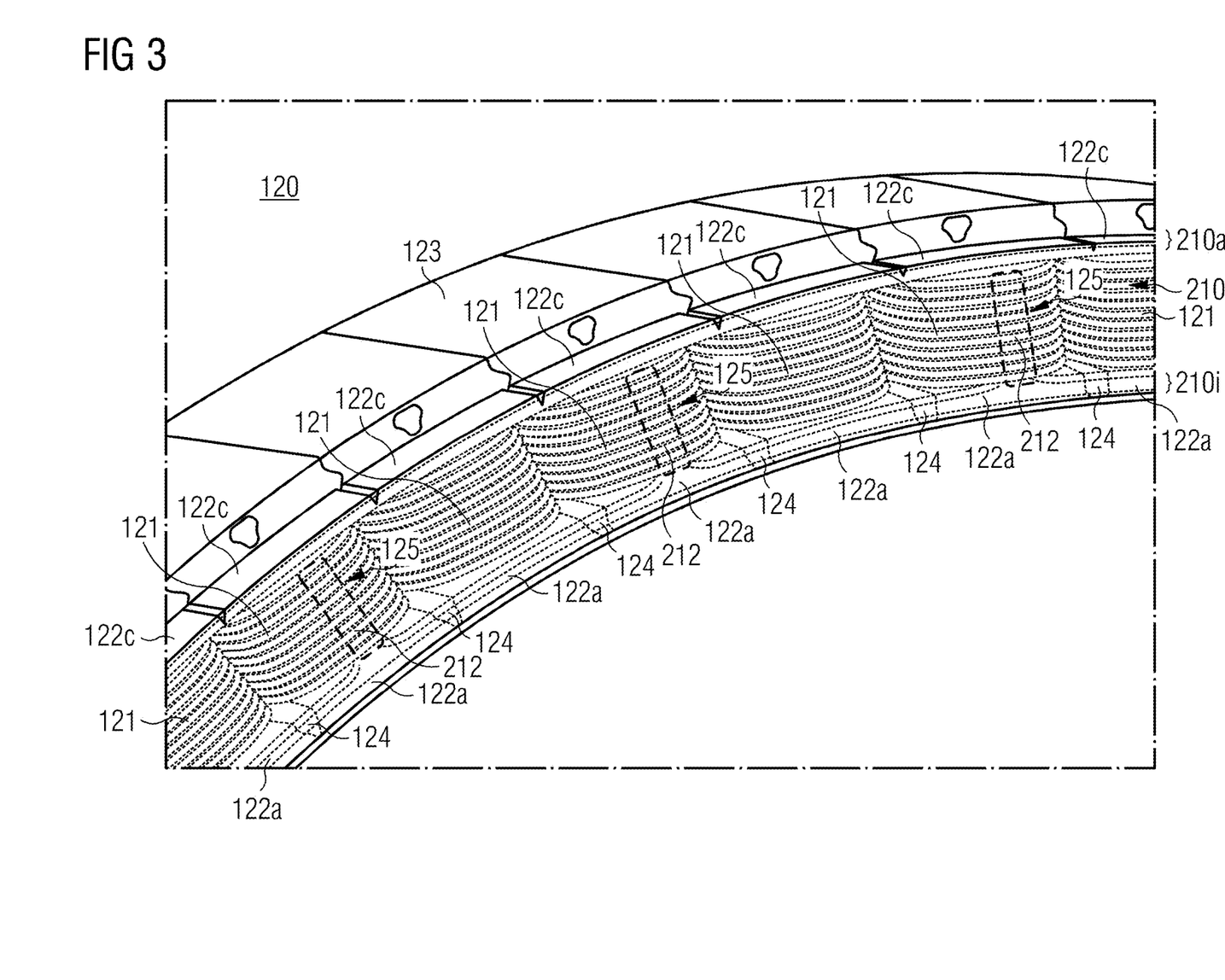
FIG. 3 shows an example of a perspective view of a section of a stator of the electrical machine.

FIG. 3 shows a perspective view of a section of the stator 120. The stator 120 has the already introduced stator ring 123, on which a multiplicity of stator teeth 122 are secured, wherein each of the stator teeth 122 carries a coil 121. In the selected illustration, only a tooth head 122a and a tooth root 122c of the stator teeth 122 may be seen in each case because the coils 121 conceal the tooth necks 122b.

Seals 124 may be arranged between two adjacent tooth heads 122a and optionally between two adjacent tooth roots 122c, these seals being intended where appropriate to prevent the coolant from leaving the coolant path 140 and hence the stator 120. These seals are not illustrated in FIG. 2.

FIG. 3 furthermore shows parts of a sealing sleeve 200 for sealing the stator 120 in a partially transparent illustration. The sealing sleeve 200 has a first sealing ring 210 and a second sealing ring 220, although the second sealing ring 220 is not visible in the illustration selected here, being arranged mirror-image-fashion with respect to the illustrated first sealing ring 210 on the other side of the stator 120 when viewed in the axial direction A, this side not being visible. The construction and functioning of the second sealing ring 220 correspond substantially to the first sealing ring 210. The sealing rings 210, 220 are flat, e.g., the respective extent thereof in the radial direction R, in each case expressed as the difference between their inside and outside radii, is a multiple of the respective extent or thickness in the axial direction A. In order to prevent coolant from escaping from the stator 120 sealed by the sealing sleeve 200 or sealing rings 210, 220, the sealing rings 210, 220 rest by their respective radially outer region 210a, 220a against the tooth roots 122c and by their respective radially inner region 210i, 220i against the tooth heads 122a. This measure is known per se and the effect thereby achieved corresponds to the function of a sealing sleeve in the design known per se.

Each of the sealing rings 210, 220 has an annular first, hard component 211, 221 and a second, soft component 212, 222. The annular first component 211, 221 may be composed of a hard elastomer, for example, and corresponds substantially in its radial dimensions, e.g., in respect of its inside and outside diameter, to the dimensions of the first 210 and of the second sealing ring 220, respectively. The first component 211, 221 acts substantially as a stable support for the second component 212, 222, which is applied to an axial surface of the first component 211, 221. In this case, the respective second component 212, 222 is applied to that axial surface of the first component 211, 221 which in each case faces the stator 120 and, in particular, the stator teeth 122 when the sealing sleeve 200 is installed in the electrical machine 100. Consequently, this also means that, in the installed state, those axial surfaces of the first components 211, 221 to which the second component 212, 222 are applied face one another.

The first components 211, 221, which are hard and, at the same time have little deformability ultimately provide the mechanical retention of the complete sealing sleeve 200 on the stator 120 and in the motor 100. The second, soft and, for example, elastically deformable components 212, 222 provide sealing with respect to the coils 121 in order to avoid coolant leakage. In contrast to this, conventional sealing sleeves may be characterized by a uniform construction and are composed of a single-component material, (e.g., of a thermoplastic or thermoset), or alternatively from a reinforced plastic.

As described at the outset, the coolant is to be guided along the meandering coolant path 140 around the teeth 122 and the coils 121 mounted thereon. This may be seen from FIG. 6, for example. For this purpose, the corresponding axial surfaces of the sealing rings 210, 220 may be in contact with the coils 121 at specific sealing locations 125 in such a way that no coolant may pass through at these specific sealing locations 125. This has the effect that the coolant takes a different route along the multiplicity of coils 121 and teeth 122, and therefore ultimately, in conjunction with the fact that coolant may flow through it at other locations, the desired coolant path 140 is formed. Seal sections 212', 222' of the second, soft component 212, 222 are now applied to the hard, first component 211, 221, at least in a manner corresponding to the specific sealing locations 125. During the installation of the sealing sleeve 200 including the two sealing rings 210, 220 in the machine 100 or on the stator 120, the radially inner 210$i$, 220$i$ and outer regions 210$a$, 220$a$ of the sealing rings 210, 220 rest, one the one hand, as already mentioned, against the tooth heads 122$a$ and tooth roots 122$c$ and thus prevent coolant escaping from the stator system 120. On the other hand, at the specific sealing locations, the seal sections 212', 222' of the second components 212, 222 press against the coils 121 situated there, wherein the second components 212 adapt by virtue of their elasticity to the external shape of the coils 121.

Figure 4:
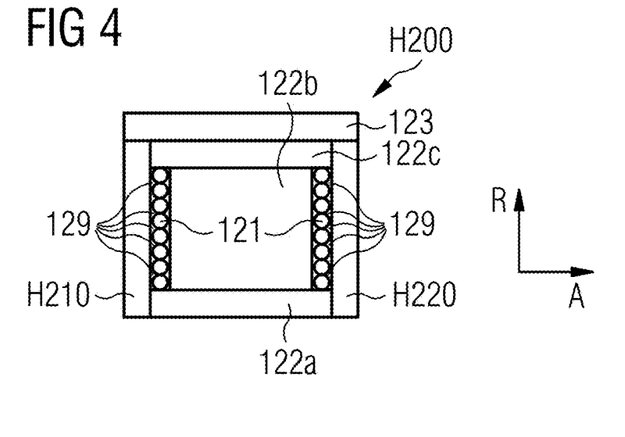
FIG. 4 shows an example of a tangential view of a section through a stator tooth with a conventional sealing sleeve.
Figure 5:
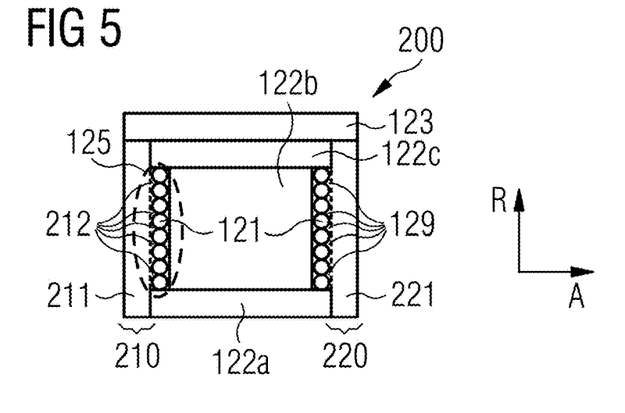
FIG. 5 shows an example of a tangential view of a section through a stator tooth with a sealing sleeve.

This is illustrated schematically in FIGS. 4 and 5. FIG. 4 shows the situation with a conventional sealing sleeve H200 with hard sealing rings H210, H220. Gaps, (some of which are denoted by reference sign 129), are formed between the sealing rings H210, H220 and the coil 121 or windings thereof. The coolant may pass through these gaps 129, with the result that the coolant leakage mentioned at the outset may occur. FIG. 5 shows the situation according to the disclosure, in which each of the two sealing rings 210, 220 has a first, hard component 211, 221 and a second, soft component 212, 222. The cross section illustrated in FIG. 5 furthermore shows that second components 212 or 222 are not provided for each tooth 122 on both sealing rings 210, 220, but in each case only on one of the sealing rings (in the illustrated case on the first sealing ring 210). This is explained in greater detail below and ultimately serves to produce the meandering coolant path. The soft component 212 or, where applicable, 222 may adapt in an ideal manner to the coil 121 by virtue of its elasticity, thus providing that the gaps 129 that are still present in FIG. 4 on the same side as the first sealing ring 210 are no longer present.

This adaptation gives rise to substantially improved sealing at these sealing locations, thus providing the no coolant may pass through there between the respective second component 212, 222 and the corresponding coil 121 against which it rests. At least the seal sections 212', 222' of the second components 212, 222 thus serve to prevent the initially explained leaks at the respective sealing locations of the sealing rings 210, 220 with respect to the coils 121 because these leaks would lead to fluid-dynamic bypasses and hence to losses in the optimum cooling characteristic, which would result in a limitation of the cooling performance.

The positions of the sealing locations are selected by appropriate positioning of the seal sections 212', 222' on the sealing rings 210, 220, in particular in such a way that the meandering coolant path is obtained. For this purpose, the tangential positions of the coils or coils 121 and of the sealing locations are matched to one another. For example, a respective seal section 212', 222' of the second components 212, 222 is to be positioned on the respective sealing ring 210, 220 in such a way that it may come into contact with a coil 121 in order to effect the sealing when the respective sealing ring 210, 220 is installed. However, it is the case for a respective sealing ring 210, 220 that a seal section 212', 222' of the second components 212, 222 is not provided for each coil 121 but only for each $n^{th}$ coil 121. In one example, n=2, (and n=2 is assumed below by way of example).

The seal sections 212' are positioned in such a way on the first sealing ring 210, and the first sealing ring 210 is positioned in such a way on the stator 120 that, when viewed in the tangential direction T, a seal section 212' and hence in each case a sealing location 125 is situated only at each $n^{th}$ coil 121, where n=2. Consistent with this, the first sealing ring 210 has no seal sections 212' at the positions assigned to those coils 121 situated between these sealing locations 125 created in this way. In the case where the stator 120 includes n121 coils 121, for example, the first sealing ring would include n212' seal sections 212', where n212'=n121/n=n121/2. Moreover, based on the fact that the stator 120 defines a coordinate system, wherein the coils 121 are situated at angles of $\alpha 121(k)=k*360°/n121$, where k=1, ..., n121, in relation to the axis of rotation, the seal sections 212' of the second component 212 of the first sealing ring 210 are positioned at angles of $\alpha 212'(l)=l*360°/n212'$, where l=1, ..., n212', (that is, at every second coil because n212'=n121/2), when the first sealing ring 210 is secured on the stator 120.

Ultimately, the second sealing ring 220 is of identical construction to the first sealing ring 210 but is arranged on the stator 120 in such a way as to be rotated by an angle of $\beta=360°/n121$ relative to the first sealing ring. In detail, this means, as in the case of the first sealing ring 210, that the seal sections 222' are positioned in such a way on the second sealing ring 220, and the second sealing ring 220 is attached in such a way to the stator 120 that, when viewed in the tangential direction T, a seal section 222' and hence in each case a sealing location 125 is situated only at each $n^{th}$ coil 121, where n=2. Consistent with this, the second sealing ring 220 also has no seal sections 222' at positions assigned to those coils 121 situated between these sealing locations 125 created in this way. Once again, in the case where the stator 120 includes n121 coils 121, for example, the second sealing ring would also include n222' seal sections 222', where n222'=n121/n=n121/2=n212'. Moreover, based once again on the fact that the stator 120 defines a coordinate system, wherein the coils 121 are as before situated at angles of $\alpha 121(k)=k*360°/n121$, where k=1, ..., n121, in relation to the axis of rotation, the seal sections 222' of the second component 222 of the second sealing ring 220 are positioned at angles of $\alpha 222'(l)=\beta+l*360°/n222'$, where l=1, ..., n212', when the second sealing ring 210 is secured on the stator 120 owing to the rotation by the angle $\beta=360°/n121$, (that is, because n222'=n121/2, at every second coil 121, but, because of the offset angle β, precisely at those coils 121 at which no seal section 212' of the second component 212 of the first sealing ring 210 is positioned).

Figure 6:
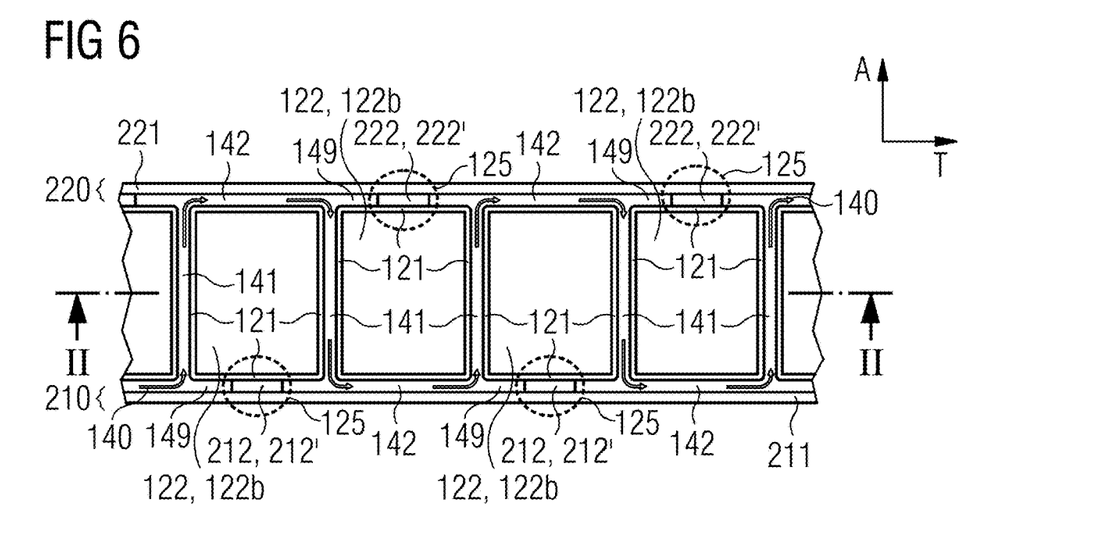
FIG. 6 shows an example of a radial view of a section through the stator teeth from FIG. 2.

Accordingly, the sealing rings 210, 220 are constructed in such a way, particularly in respect of the respective positions of the seal sections 212', 222' of the second components 212, 222, and positioned on the stator 120 in such a way that, when a seal section 212' of the second component 212 of the first sealing ring 210 is resting against a coil 121($k$), a seal section 222' of the second component 222 of the second sealing ring 220 rests against the coil 121($k$+1) adjacent to the coil 121($k$), and vice versa. The seal sections 212', 222' of both sealing rings 210, 222 do not rest against any of the coils 121. This construction has the consequence that the meandering coolant path 140 already mentioned several times may be formed. This is illustrated in FIG. 6, wherein a view oriented in the radial direction R of a section through the stator teeth 122 already illustrated in FIG. 2 is illustrated there. This view is denoted by "VI" in FIG. 2.

These positions and the constructions of the sealing rings 210, 220 become clear in FIG. 6 by virtue of the fact that firstly, as described, the respective sealing ring 210 or 220 has a seal section 212', 222' of the respective second component 212, 222 only for each second coil 121 or, accordingly, for each second tooth 122, and secondly that seal sections 212', 222' of both sealing rings 210, 220 do not rest against any coil 121. The meandering coolant path 140, indicated by the arrows in FIG. 6, is thus made up of the intermediate spaces 141 already introduced in connection with FIG. 2. The regions 142 left free between the coil 121 and the first 210 or second sealing ring 220, in each case at the locations at which no seal sections 212' and 222', respectively, of the second components 212, 222 of the sealing rings 210, 220, are provided.

Figure 7:
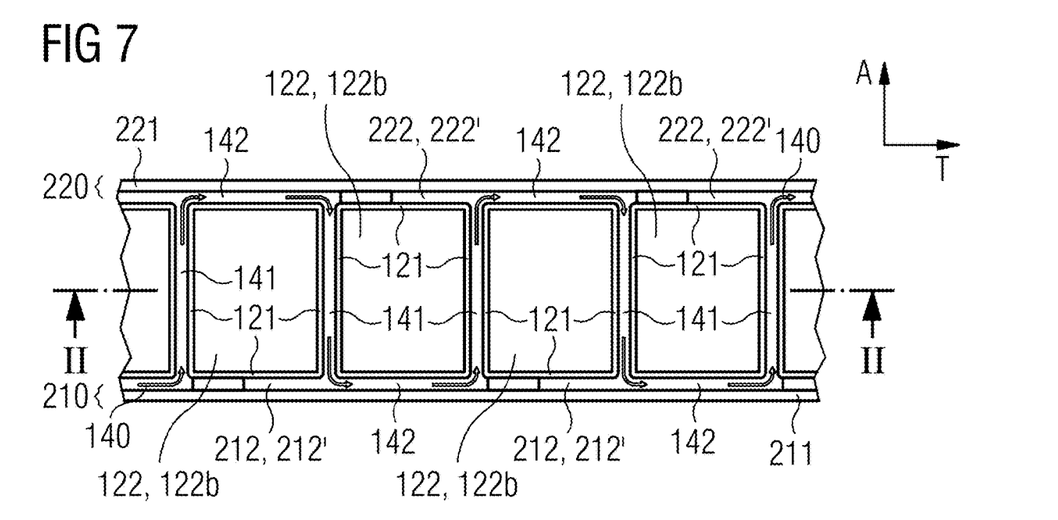
FIG. 7 shows an example of a radial view of the section through the stator teeth from FIG. 2 with an alternative arrangement of the seal sections.

In FIG. 6, it has been illustrated that, when viewed in the tangential direction T, the respective seal sections 212', 222' are arranged in the center of the respective coil 121 or of the respective stator tooth 122. Based on the fact that the overall coolant flow ultimately runs in the positive tangential direction T, e.g., from left to right in FIG. 6, the seal sections 212', 222' may be shifted out of the position of the respective center of the stator teeth 122 in a direction counter to the overall coolant flow. This is indicated in FIG. 7. This prevents the occurrence of coolant buildups at the locations indicated by the reference sign 149 in FIG. 6 because these locations are not present in the design according to FIG. 7.

Figure 8:
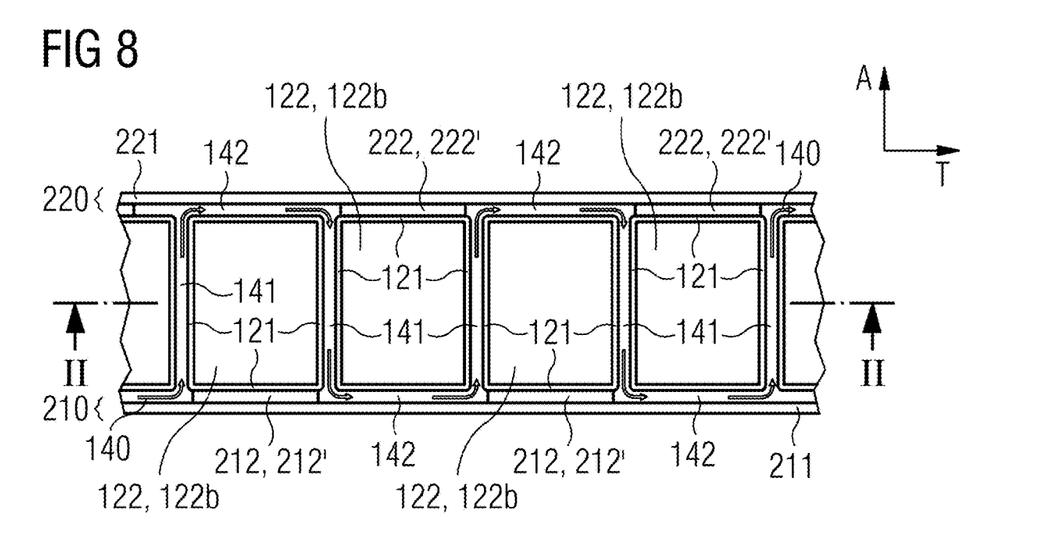
FIG. 8 shows an example of a radial view of a section through the stator teeth from FIG. 2 with an alternative design of the seal sections.

An alternative to this is shown in FIG. 8. There, the first seal sections 212', 222' are selected and dimensioned in such a way that their extents in the tangential direction T correspond to the extents of the coils 121 in the tangential direction T. This provides that there are no unsealed gaps on those sides of the stator 120 on which a seal section 212', 222' rests against a respective coil 121.

FIGS. 9-12, which relate to a first embodiment of the sealing sleeve 200 and of the sealing rings 210, 220, show the first sealing ring 210 as a representative of both sealing rings 210, 220 of the sealing sleeve 200. FIG. 9, in which once again only a small number of component parts is provided with reference signs for the sake of clarity, shows an axial view of the first sealing ring 210. To further clarify the relationships between the positions of the seal sections 212' and of the coils 121 of the stator 120, the coils 121 are also indicated by a dashed line in FIG. 9. However, the coils 121 are not part of the sealing ring 210 or of the sealing sleeve 200. Purely by way of example, the second component 212 of the first sealing ring 210 has n212'=18 seal sections 212' in the illustrated case. Consistent with this, this first sealing ring 210 and the equivalently designed second sealing ring 220 are provided for a stator 120, which has n121=2*n212'=36 stator teeth 122, each having one coil 121.

Figure 9:
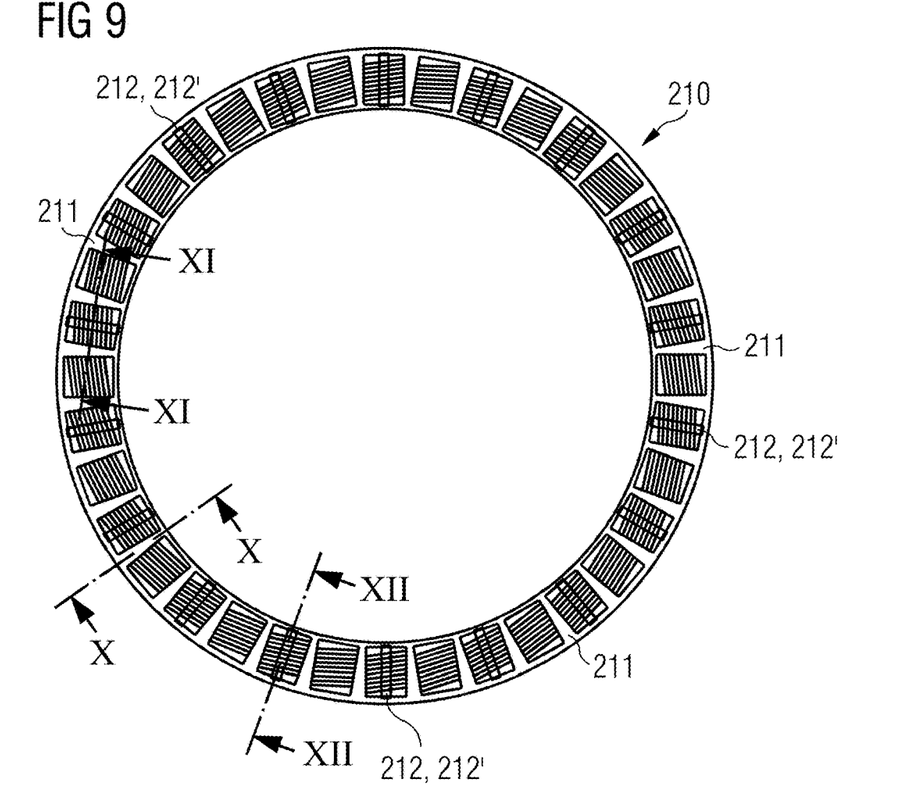
FIG. 9 shows an axial view of a sealing ring of the sealing sleeve in a first embodiment.
Figure 12:
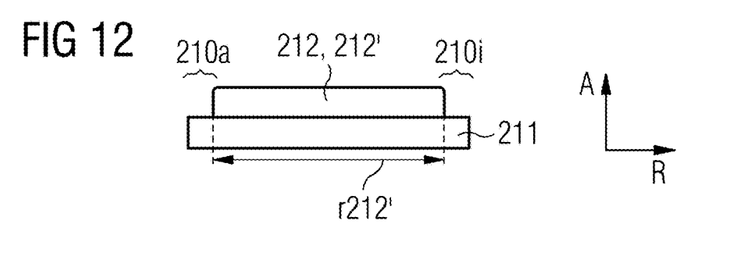
FIG. 12 shows the section denoted by "XII" in FIG. 7.
Figure 13:
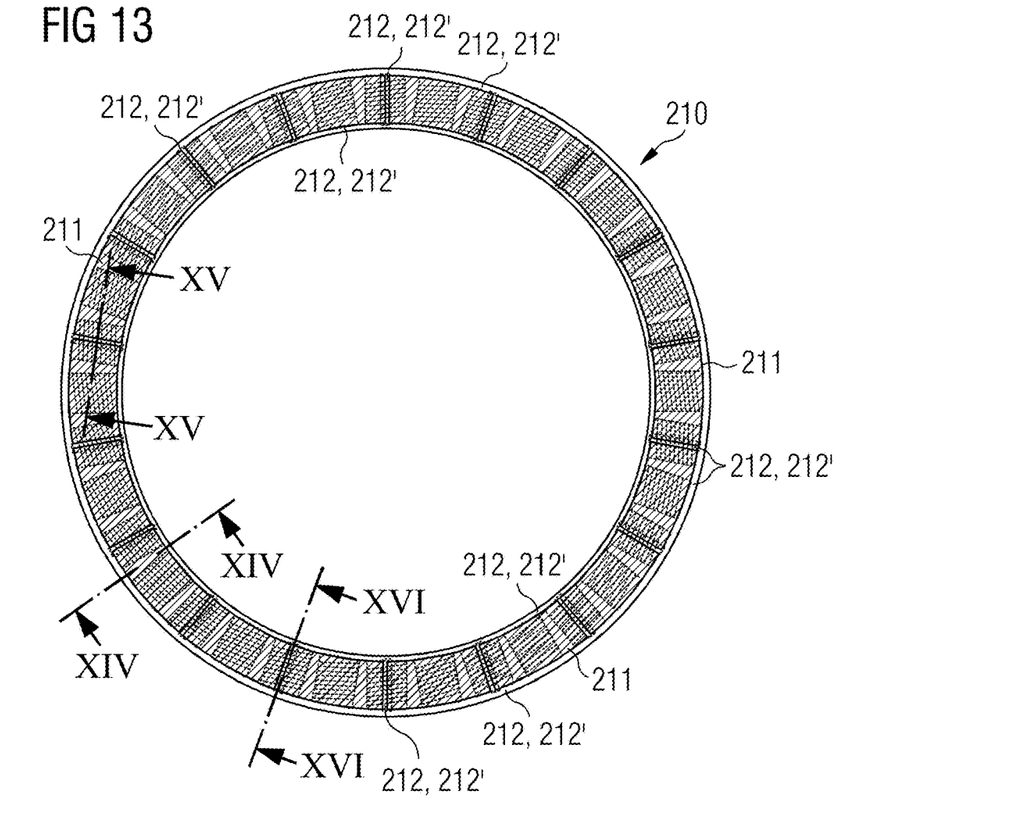
FIG. 13 shows an axial view of a sealing ring of the sealing sleeve in a second embodiment.

As becomes clear in FIG. 9 and especially in FIG. 12, the seal sections 212' in the first embodiment do not extend over the entire first component 211 of the first sealing ring 210 in the radial direction R. In contrast, the seal sections 212' leave out the radially inner regions 210i and the radially outer regions 210a of the first sealing ring 210 by which, as already described above, the first sealing ring 210 rests against the tooth heads 122a and against the tooth roots 122c in the installed state. Consistent with this, the radial extents r212' of the seal sections 212' of the second component 212 of the first sealing ring 210 correspond to the radial extents r122b of the tooth necks 122b.

Figure 10:
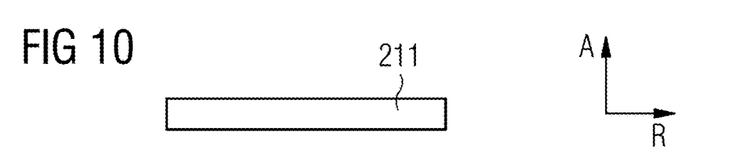
FIG. 10 shows the section denoted by "X" in FIG. 7.

FIG. 10 illustrates that the sealing ring 210 has only the first component 211 in the regions in which no seal sections 212' are provided.

As already indicated, the second sealing ring 120 is of equivalent or identical design to the first sealing ring 210. The above description relating to FIGS. 9-12 is therefore applicable analogously to the second sealing ring 120 with correspondingly adapted reference signs and, where appropriate, terms.

FIGS. 13-16 relate to a second embodiment of the sealing sleeve 200 and of the sealing rings 210, 220. Here, the first sealing ring 210 is once again illustrated as a representative of both the sealing rings 210, 220 of the sealing sleeve 200. In contrast to the first embodiment, in which the second, soft component 212 includes only the seal sections 212' which are to rest directly against the coils 121 in the assembled state, it is envisaged in the second embodiment illustrated here that, in addition to these first sections 212', the soft, second component 212 includes further seal sections 212", which are of substantially annular design and are formed in those regions 210a, 210i of the sealing ring 210 which rest against the tooth heads 122a and against the tooth roots 122c in the installed state. The first seal sections 212' extend in the radial direction between the further sections 212".

Figure 11:
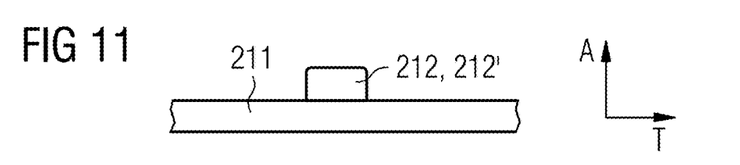
FIG. 11 shows the section denoted by "XI" in FIG. 7.
Figure 14:
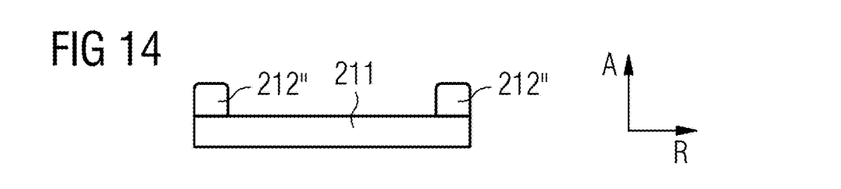
FIG. 14 shows the section denoted by "XIV" in FIG. 11.
Figure 15:
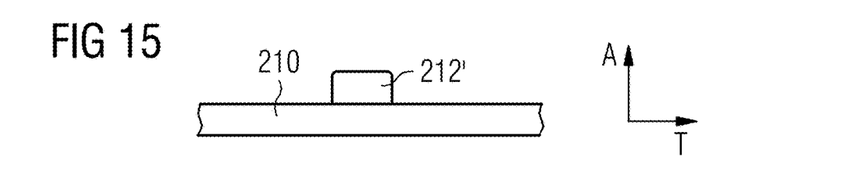
FIG. 15 shows the section denoted by "XV" in FIG. 11.
Figure 16:
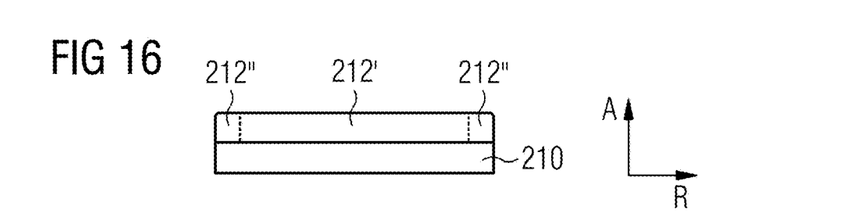
FIG. 16 shows the section denoted by "XVI" in FIG. 11.

FIGS. 14-16 show the cross sections indicated by "XIV", "XV" and "XVI" in FIG. 11, which illustrate the arrangement particularly of the seal sections 212', 212" of the second component 212. It becomes clear, particularly from FIG. 16, that, in the second embodiment, unlike the first embodiment, the second component 212 extends in the radial direction over the entire sealing ring 210 and not just between the radially inner region 210i and the radially outer region 210a.

Figure 17:
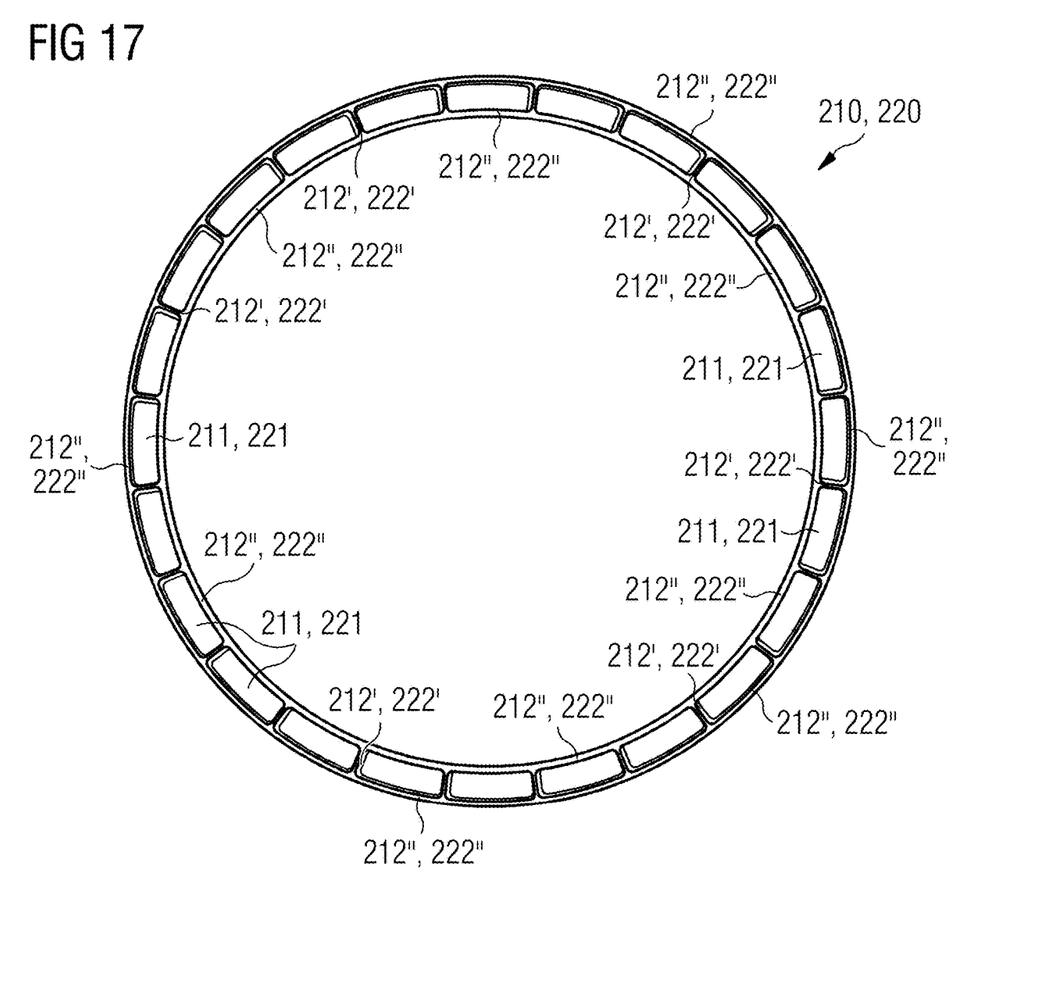
FIG. 17 shows a perspective illustration of the sealing ring in the second embodiment.

Finally, FIG. 17 shows a perspective illustration of the sealing ring 210 or 220, wherein the respective flat, first component 211, 221 lies in the background and the second component 212, 222 according to the second embodiment is applied to the first component 211, 221, with the result that it more or less faces the observer. Here too, for the sake of clarity, only some parts are provided with reference signs.

If appropriate, the seal sections 212' and 222' may be applied together with the further sections 212", 222" to the respective hard, first component 211, 221 by an injection molding process. Alternatively, the respective sealing ring 210, 220 as a whole may be produced from a partially hard elastomer forming the first component 211, 221 and a partially soft elastomer forming the second component 212, 222. It would also be possible to employ additive manufacturing methods to produce the two-component sealing rings 210, 220.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

LIST OF REFERENCE SIGNS

- 100 Electrical machine, electric motor
- 110 Rotor
- 111 Rotor main body
- 112 Second magnetic means, permanent magnet
- 120 Stator
- 121 First magnetic means, coil
- 122 Stator tooth
- 123 Stator ring
- 122a Tooth head
- 122b Tooth neck
- 122c Tooth root
- 124 Seal
- 125 Sealing location
- 129 Gap
- 130 Shaft
- 140 Coolant path
- 141 Intermediate space
- 149 Coolant buildup
- 200 Sealing sleeve
- 210 First sealing ring
- 210a, 220a Radially outer region
- 210i, 220i Radially inner region
- 211, 221 First, hard component
- 212, 222 Second, soft component
- 212', 222' First seal sections
- 212", 222" Further seal sections
- 220 Second sealing ring
- H200 Conventional sealing sleeve
- H210, H220 Sealing rings

The invention claimed is:

1. A sealing ring of a sealing sleeve for a stator of an electrical machine, the sealing sleeve having a multiplicity of coils and stator teeth, the sealing ring comprising:
    a first, hard component; and
    a second, deformable component,
    wherein the second component is applied to a first axial surface of the first component,
    wherein the second component comprises first seal sections arranged on the first axial surface in a manner distributed along a tangential direction and with specific angular spacings relative to one another,
    wherein the angular spacings between centers of two adjacent first seal sections when viewed in the tangential direction are $360°/n212'$,
    wherein $n212'$ indicates a number of first seal sections, and
    wherein $n212'=n121/N$, where $n121$ indicates a number of coils of the stator and $N \geq 2$.

2. The sealing ring of claim 1, wherein the sealing ring has a radially outer region and a radially inner region, and
    wherein the first seal sections extend in a radial direction between the radially outer region and the radially inner region.

3. The sealing ring of claim 2, wherein a radial extent of one of the radially outer region and the radially inner region of the sealing ring corresponds to a radial thickness of a respective tooth root of the stator teeth,
    wherein a radial extent of the other of the radially outer region and the radially inner region of the sealing ring corresponds to a radial thickness of a respective tooth head of the stator teeth, and
    wherein a radial spacing between the radially outer region and the radially inner region corresponds to a radial extent of a respective tooth neck of the stator teeth.

4. The sealing ring of claim 2, wherein the second component comprises further seal sections,
    wherein a first further seal section of the further seal sections is applied in the radially outer region of the first axial surface of the first component, and a second further seal section of the further seal sections is applied in the radially inner region of the first axial surface of the first component,
    wherein the further seal sections are circular-ring-shaped and are coaxial with one another, and
    wherein the first seal sections extend in the radial direction between the first further seal section and the second further seal section.

5. The sealing ring of claim 4, wherein the first seal sections and the further seal sections merge into one another.

6. The sealing ring of claim 1, wherein the first seal sections have an extent in the tangential direction which corresponds at least to a tangential extent of a respective stator tooth.

7. A sealing sleeve for a stator of an electrical machine, the stator having a multiplicity of coils and stator teeth, the sealing sleeve comprising:
    a first sealing ring; and
    a second sealing ring,
    wherein each sealing ring of the first sealing ring and the second sealing ring has a first, hard component and a second, deformable component, where the second component is applied to a first axial surface of the first component,
    wherein the first sealing ring and the second sealing ring are arranged coaxially with respect to one another such that the first axial surfaces of the first components of the first and second sealing rings and the second components of the first and second sealing rings face one another, and
    wherein the first sealing ring is rotated by an angle $\beta=360°/n121$ relative to the second sealing ring, where $n121$ indicates a number of coils of the stator.

8. The sealing sleeve of claim 7, wherein the second component of each sealing ring comprises a multiplicity of first seal sections arranged on the respective first axial surface of the first component of a respective sealing ring in a manner distributed along a tangential direction and with specific angular spacings relative to one another,
    wherein the first seal sections of the second component of the first sealing ring are arranged at angles of $\alpha 212'(l) = l*360°/n212'$, where $l=1, \ldots, n212'$, wherein $n212'$ indicates a number of first seal sections of the second component of the first sealing ring, and
    wherein the first seal sections of the second component of the second sealing ring are arranged at angles of $\alpha 222'(l) = \beta + l*360°/n222'$ where $l=1, \ldots, n222'$, wherein $n222'$ indicates the number of first seal sections of the second component of the second sealing ring.

9. A stator for an electrical machine, the stator comprising:
    a multiplicity of coils arranged one behind another when viewed in a tangential direction; and
    a sealing sleeve comprising a first sealing ring and a second sealing ring, wherein each sealing ring has a first, hard component and a second, deformable component, where the second component is applied to a first axial surface of the first component, wherein the first sealing ring and the second sealing ring are arranged coaxially with respect to one another such that the first axial surfaces of the first components of the first and second sealing rings and the second components of the first and second sealing rings face one another, and wherein the first sealing ring is rotated by an angle $\beta=360°/n121$ relative to the second sealing ring, where n121 indicates a number of coils of the stator;

wherein the sealing sleeve is arranged on the stator such that at least first seal sections of the second components of the sealing rings of the sealing sleeve each rest against specific coils of the multiplicity of coils, and wherein, when the multiplicity of coils and second components are resting against one another, a surface of a respective first seal section of the second component facing the respective coil adapts to the respective surface of the coil facing the respective first seal section of the second component by virtue of the deformability of the second component.

10. The stator of claim 9, wherein first seal sections of the second component of the first sealing ring, but not first seal sections of the second component of the second sealing ring, rest against each $N^{th}$ coil of the multiplicity of coils of the stator, where N≥2, and wherein the first seal sections of the second component of the second sealing ring, but not the first seal sections of the second component of the first sealing ring, rest against the remaining coils of the multiplicity of coils of the stator.

11. The stator of claim 9, wherein, for a coil against which one of the first seal sections of the second component of one of the first and second sealing rings rests, there is an intermediate space between the respective coil and the first component of the respective other sealing ring.

12. The stator of claim 9, wherein coils of the multiplicity of coils arranged at angles $\alpha 121(k)=k*360°/n121$, where k=1, . . . , n121, wherein the second component of each sealing ring comprises a multiplicity of first seal sections distributed along a respective tangential direction and arranged on the first axial surface of the first component of a respective sealing ring, wherein the first seal sections of the second component of the first sealing ring are arranged at angles of $\alpha 212'(l) =l*360°/n212'$, where l=1, . . . , n212' and n212' indicates a number of first seal sections of the first sealing ring, wherein the first seal sections of the second component of the second sealing ring are arranged at angles of $\alpha 222'(l)=\beta+l*360°/n222'$ where l=1, . . . , n222' and n222' indicates a number of first seal sections of the second sealing ring, and wherein $\beta=360°/n121$ describes a rotation of the second sealing ring relative to the first sealing ring, and wherein n212'=n222'=n121/2.

13. The sealing sleeve of claim 1, wherein N=2.

14. The stator of claim 10, wherein N=2.

15. The stator of claim 11, wherein a cooling fluid is configured to flow through a respective intermediate space to cool the stator, and wherein the cooling fluid is configured to flow in a tangential direction through the respective intermediate space past a respective coil to a next coil adjacent to the respective coil.

16. The stator of claim 1, wherein, for a coil against which one of the first seal sections of the second component of one of the first and second sealing rings rests, there is an intermediate space between the respective coil and the first component of the respective other sealing ring, wherein a cooling fluid is configured to flow through a respective intermediate space to cool the stator, and wherein the cooling fluid is configured to flow in a tangential direction through the respective intermediate space past a respective coil to a next coil adjacent to the respective coil.

\* \* \* \* \*